US010462158B2

(12) United States Patent
Yagi et al.

(10) Patent No.: US 10,462,158 B2
(45) Date of Patent: Oct. 29, 2019

(54) URL SELECTION METHOD, URL SELECTION SYSTEM, URL SELECTION DEVICE, AND URL SELECTION PROGRAM

(71) Applicant: NIPPON TELEGRAPH AND TELEPHONE CORPORATION, Chiyoda-ku (JP)

(72) Inventors: Takeshi Yagi, Musashino (JP); Daiki Chiba, Musashino (JP); Kazunori Kamiya, Musashino (JP); Tohru Sato, Musashino (JP); Kensuke Nakata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 248 days.

(21) Appl. No.: 15/120,940

(22) PCT Filed: Mar. 16, 2015

(86) PCT No.: PCT/JP2015/057702
§ 371 (c)(1),
(2) Date: Aug. 23, 2016

(87) PCT Pub. No.: WO2015/141628
PCT Pub. Date: Sep. 24, 2015

(65) Prior Publication Data
US 2016/0381052 A1 Dec. 29, 2016

(30) Foreign Application Priority Data

Mar. 19, 2014 (JP) ................................ 2014-056663

(51) Int. Cl.
G06F 16/30 (2019.01)
H04L 29/06 (2006.01)
(Continued)

(52) U.S. Cl.
CPC ........ *H04L 63/1416* (2013.01); *G06F 16/958* (2019.01); *G06F 16/9566* (2019.01);
(Continued)

(58) Field of Classification Search
CPC ............. H04L 63/1416; H04L 62/1425; G06F 17/30887; G06F 17/3089
(Continued)

(56) References Cited

U.S. PATENT DOCUMENTS 6,728,704 B2 * 4/2004 Mao ...................... G06F 16/951
8,302,191 B1 * 10/2012 Conrad ................... G06F 21/56
726/22
(Continued)

FOREIGN PATENT DOCUMENTS

JP 2004-30286 A 1/2004
JP 2006-48546 A 2/2006
(Continued)

OTHER PUBLICATIONS

International Search Report dated Jun. 16, 2015 for PCT/JP2015/057702 filed Mar. 16, 2015.

*Primary Examiner* — Hosain T Alam
*Assistant Examiner* — Robert F May
(74) *Attorney, Agent, or Firm* — Oblon, McClelland, Maier & Neustadt, L.L.P.

(57) ABSTRACT

A URL selection method disclosed in the present application includes a first extraction step and a second extraction step. The first extraction step extracts URLs up to an upper limit value of the number of URLs set to each of URL groups in a range where a total number of URLs is within a predetermined number of URLs, in order of priority set to each of the URL groups, from each of the URL groups identified by analyzing a traffic log by techniques in different categories. The second extraction step further extracts URLs within the (Continued)

predetermined number of URLs, based on the priority, when the total number of URLs extracted from each of the URL groups in the first extraction step is less than the predetermined number of URLs.

9 Claims, 12 Drawing Sheets

(51) Int. Cl.
*G06F 16/958* (2019.01)
*G06F 16/955* (2019.01)
*G06F 21/55* (2013.01)
*H04L 12/64* (2006.01)

(52) U.S. Cl.
CPC .......... *G06F 21/55* (2013.01); *H04L 12/6418* (2013.01); *H04L 63/1425* (2013.01)

(58) Field of Classification Search
USPC ........................................................ 707/769
See application file for complete search history.

(56) References Cited

U.S. PATENT DOCUMENTS

| | | | |
|---|---|---|---|
| 2007/0016574 A1* | 1/2007 | Carmel | G06F 16/951 |
| 2007/0204345 A1 | 8/2007 | Pereira et al. | |
| 2007/0240165 A1* | 10/2007 | Carey | G06F 9/54 |
| | | | 719/310 |
| 2008/0301281 A1* | 12/2008 | Wang | G06F 21/56 |
| | | | 709/224 |
| 2010/0223297 A1* | 9/2010 | Li | G06F 9/5027 |
| | | | 707/802 |
| 2011/0040749 A1* | 2/2011 | Ceri | G06F 16/9535 |
| | | | 707/723 |
| 2014/0007238 A1* | 1/2014 | Magee | G06F 21/577 |
| | | | 726/24 |
| 2015/0381637 A1* | 12/2015 | Raff | H04L 63/0218 |
| | | | 726/23 |

FOREIGN PATENT DOCUMENTS

| | | |
|---|---|---|
| JP | 4995170 B2 | 8/2012 |
| JP | 5411966 B2 | 2/2014 |
| JP | 5415390 B2 | 2/2014 |
| WO | WO-2014206047 A1 * 12/2014 | ........... H04L 63/101 |

* cited by examiner

|  | PRIORITY | UPPER LIMIT VALUE |
|---|---|---|
| ANALYSIS UNIT 33 | 2 | 3 |
| ANALYSIS UNIT 34 | 1 | 4 |
| ANALYSIS UNIT 35 | 3 | 3 |

|  | PRIORITY | UPPER LIMIT VALUE |
|---|---|---|
| ANALYSIS UNIT 33 | 2 | 1 |
| ANALYSIS UNIT 34 | 1 | 8 |
| ANALYSIS UNIT 35 | 3 | 1 |

FIG.5

| URL GROUP IDENTIFIED BY ANALYSIS UNIT 33 | ORDER OF PRIORITY |
|---|---|
| http://host#1/d-A/d-B/d-C/file-a | 1 |
| http://host#2/d-D/d-E/d-C/file-b?x=12 | 2 |
| http://host#3/d-A/d-H/d-Z/file-x?d=1224 | 3 |
| http://host#4/d-S/d-S/d-D/file-c?a=user1 | 4 |
| http://host#3/d-M/d-N/d-C/file-w | 5 |

FIG.6

| URL GROUP IDENTIFIED BY ANALYSIS UNIT 34 |
|---|
| http://host#7/d-D/d-H/d-E/file-g?y=1 |
| http://host#2/d-E/d-J/d-K/file-e |
| http://host#5/d-X/d-O/d-P/file-art?user=1&pw=ad |
| http://host#9/d-H/d-R/file-tmp |

FIG.7

| URL GROUP IDENTIFIED BY ANALYSIS UNIT 35 | ORDER OF PRIORITY |
|---|---|
| http://host#4 | 1 |
| http://host#3/d-R/d-X/d-D/file-i?id=12312 | 2 |
| http://host#8/d-A/d-B/d-C/file-t | 2 |
| http://host#1/d-A/d-E/d-E/file-j?z=mmdd | 3 |

FIG.8

| |
|---|
| http://host#7/d-D/d-H/d-E/file-g?y=1 |
| http://host#2/d-E/d-J/d-K/file-e |
| http://host#5/d-X/d-O/d-P/file-art?user=1&pw=ad |
| http://host#9/d-H/d-R/file-tmp |
| http://host#1/d-A/d-B/d-C/file-a |
| http://host#2/d-D/d-E/d-C/file-b?x=12 |
| http://host#3/d-A/d-H/d-Z/file-x?d=1224 |
| http://host#4 |
| http://host#3/d-R/d-X/d-D/file-i?id=12312 |
| http://host#8/d-A/d-B/d-C/file-t |

FIG.9

| |
|---|
| http://host#7/d-D/d-H/d-E/file-g?y=1 |
| http://host#2/d-E/d-J/d-K/file-e |
| http://host#5/d-X/d-O/d-P/file-art?user=1&pw=ad |
| http://host#9/d-H/d-R/file-tmp |
| http://host#1/d-A/d-B/d-C/file-a |
| http://host#4 |
| http://host#2/d-D/d-E/d-C/file-b?x=12 |
| http://host#3/d-A/d-H/d-Z/file-x?d=1224 |
| http://host#4/d-S/d-S/d-D/file-c?a=user1 |
| http://host#3/d-M/d-N/d-C/file-w |

|  | PRIORITY | UPPER LIMIT VALUE |
|---|---|---|
| ANALYSIS UNIT 33 | 1 | 8 |
| ANALYSIS UNIT 34 | 2 | 1 |
| ANALYSIS UNIT 35 | 3 | 1 |

FIG.12

| |
|---|
| http://host#1/d-A/d-B/d-C/file-a |
| http://host#2/d-D/d-E/d-C/file-b?x=12 |
| http://host#3/d-A/d-H/d-Z/file-x?d=1224 |
| http://host#4/d-S/d-S/d-D/file-c?a=user1 |
| http://host#3/d-M/d-N/d-C/file-w |
| http://host#7/d-D/d-H/d-E/file-g?y=1 |
| http://host#4 |
| http://host#2/d-E/d-J/d-K/file-e |
| http://host#5/d-X/d-O/d-P/file-art?user=1&pw=ad |
| http://host#9/d-H/d-R/file-tmp |

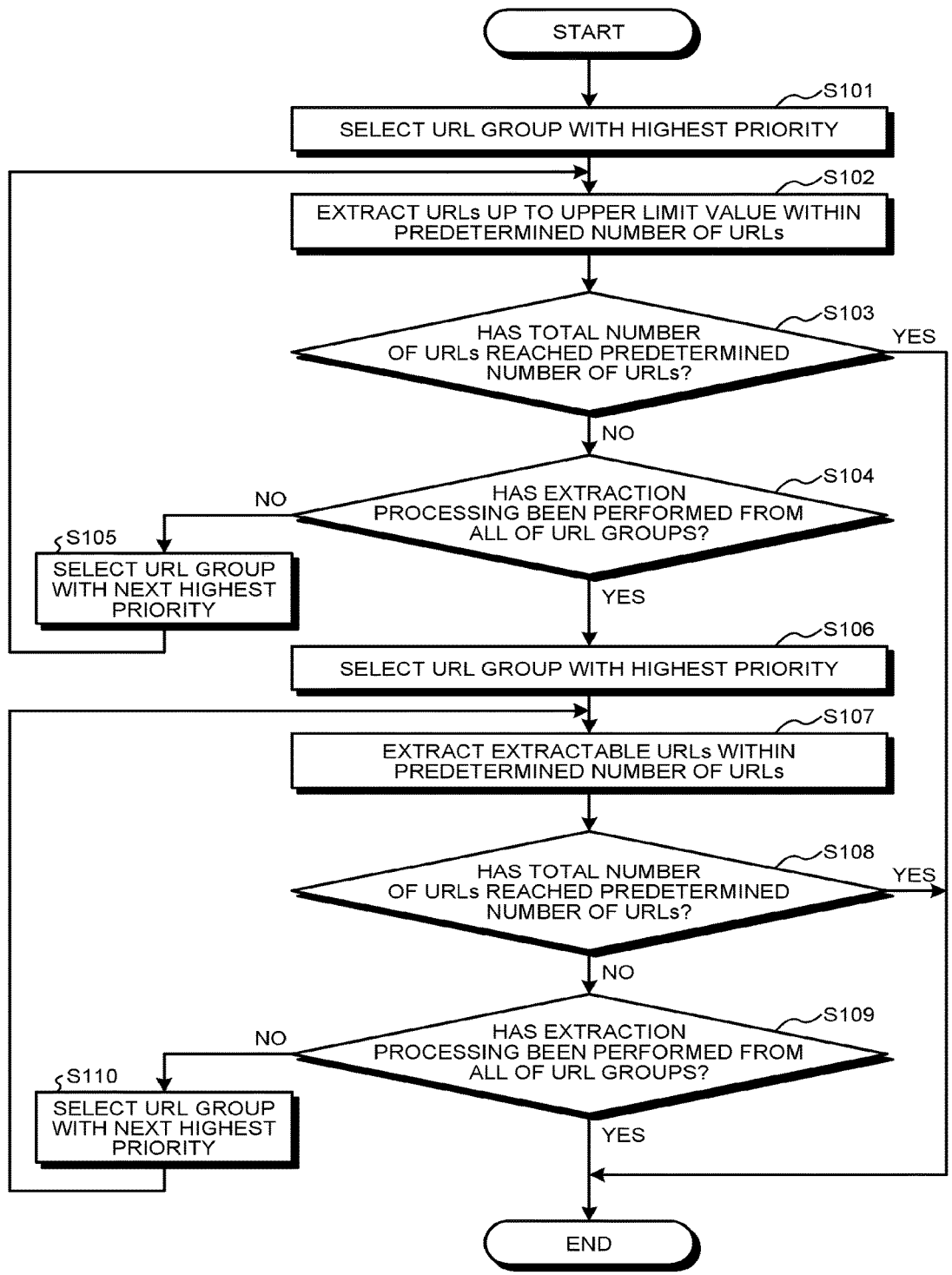

FIG.14

| |
|---|
| http://host#7/d-D/d-H/d-E/file-g?y=1 |
| http://host#2/d-E/d-J/d-K/file-e |
| http://host#5/d-X/d-O/d-P/file-art?user=1&pw=ad |
| http://host#9/d-H/d-R/file-tmp |
| http://host#1/d-A/d-B/d-C/file-a |
| http://host#4 |
| http://host#2/d-D/d-E/d-C/file-b?x=12 |
| http://host#3/d-R/d-X/d-D/file-i?id=12312 |
| http://host#3/d-A/d-H/d-Z/file-x?d=1224 |
| http://host#8/d-A/d-B/d-C/file-t |

URL SELECTION METHOD, URL SELECTION SYSTEM, URL SELECTION DEVICE, AND URL SELECTION PROGRAM

FIELD

The present invention relates to a URL selection method, a URL selection system, a URL selection device, and a URL selection program.

BACKGROUND

With advance of social infrastructure of the Internet, cyber attacks such as fishing and spam distribution have been increasing. Many of the cyber attacks are carried out using malicious tools called malwares created by attackers. The attackers distribute the malwares to terminals and servers of users, and remotely control the malwares to illegally control the terminals and servers.

In recent years, many of the malwares have been distributed through the hypertext transfer protocol (HTTP). One of major causes thereof is spread of technologies that use personal computers (PCs) of general users and web sites as steppingstones to hide the attack sources. For example, the PCs of general users and the web sites receive attacks that make use of vulnerability of operating systems (OSs), web browsers and its plug-ins, and web applications and are infected with the malwares, and are used as the steppingstone PCs and steppingstone sites for new attacks.

As a system to protect the attacks that infect the web sites with the malwares, a system that monitors accesses to the web sites by a security appliance such as the intrusion detection system (IDS), the intrusion prevention system (IPS), or the web application firewall (WAF), and filters an access having characteristic information that is matched with characteristic information of the attacks has been employed. To be specific, whether a portion that indicates a destination parameter of a uniform resource locator (URL) of the access is a parameter included in a vulnerable program used for the attack is inspected. Further, a system that monitors accesses to an outside, which occur at the time of infection with the malware, and filters an access with a destination URL that is matched with a malicious URL used for the attack, has been under examination.

As a technique of finding the malicious URL, a variety of techniques exist. These techniques can be roughly classified into a technique of finding the malicious URL before being used in user environments by a decoy system such as a honey pot, and a technique of finding the malicious URL after having been used in the user environments by a log analysis technology, antivirus software, or the like. In the technique of finding the malicious URL before being used in user environments, the attack can be highly accurately detected with the honey pot having a function to grasp a characteristic of the attack or a behavior of the PCs and the servers at the time of occurrence of the attack. In the technique of finding the malicious URL after having been used in the user environments, the attack can be highly accurately detected based on similarity between the attack observed in the past and the log. A URL determined as the malicious URL can be identified by extracting the destination URL from an external access, in the attack identified by either system. Hereinafter, the technique of finding the malicious URL is described as "analysis technique".

Patent Literature 1: Japanese Patent No. 4995170
Patent Literature 2: Japanese Patent No. 5411966
Patent Literature 3: Japanese Patent No. 5415390

However, the above-described conventional technologies have a problem that detection omission of the malicious URL may occur when a URL list is created from the malicious URLs analyzed by the analysis techniques.

To be specific, as described above, there is a wide variety of the techniques of finding the malicious URL, and the detection accuracy varies among the techniques. Meanwhile, in the filtering using the malicious URL, the malicious URL list is used as a black list, and needs to be imported to the security appliance such as the IDS, IPS, or WAF, as a filter condition. The number of importable URLs has an upper limit value due to processing performance. As a result, it is difficult to import all of the malicious URLs found by the techniques to the security appliance.

The analysis technique may or may not provide scores that indicate the degree of maliciousness to the respective malicious URLs identified by itself. Further, there is a difference in a detection rate to find the malicious URL and there is also a difference in an erroneous detection rate to erroneously detect a legitimate URL as the malicious URL among the analysis techniques. Further, the number of the found malicious URLs may be changed according to the analysis techniques even if the same log is analyzed. Further, the numbers of the found malicious URLs may be changed even by the same analysis technique when different logs are analyzed.

Conventionally, when the malicious URLs found by a plurality of analysis techniques are made to one URL list, priority for each technique is determined, and the URL found by the analysis technique with high priority is preferentially described in the URL list. However, in this technique, diversity in using the plurality of analysis techniques is impaired, and a decrease in the detection rate or an increase in the erroneous detection rate may be caused. Further, a technique of writing the latest found URL to the URL list has been examined. However, there is still a risk that the malicious URL found by a specific analysis technique may be intensively described to the URL list by this technique.

Therefore, a URL selection system is required for the plurality of analysis techniques, which can write output results of the respective techniques, and can write the maximum allowable number of URLs to the URL list.

The disclosed technology has been made in view of the foregoing, and an objective is to suppress the detection omission of the malicious URL when generating the URL list from the malicious URLs analyzed by the analysis techniques.

SUMMARY

According to the embodiments of the invention, a URL selection method to be executed in a URL selection device includes a first extraction step of extracting URLs up to an upper limit value of the number of URLs set to each of URL groups in a range where a total number of URLs is within a predetermined number of URLs, in order of priority set to each of the URL groups, from each of the URL groups identified by analyzing a traffic log by techniques in different categories, and a second extraction step of further extracting URLs within the predetermined number of URLs, based on the priority, when the total number of URLs extracted from each of the URL groups in the first extraction step is less than the predetermined number of URLs.

Advantageous Effects of Invention

According to one aspect of a URL selection method, a URL selection system, a URL selection device, and a URL selection program, which are to be disclosed, can suppress detection omission of a malicious URL when a URL list is generated from malicious URLs analyzed by analysis techniques.

BRIEF DESCRIPTION OF DRAWINGS

FIG. 3 is a diagram illustrating an example of a data structure stored in an analysis function priority management table according to the first embodiment.

FIG. 4 is a diagram illustrating another example of the data structure stored in the analysis function priority management table according to the first embodiment.

FIG. 5 is a diagram illustrating an example of a URL group identified by an analysis unit according to the first embodiment.

FIG. 6 is a diagram illustrating an example of the URL group identified by the analysis unit according to the first embodiment.

FIG. 7 is a diagram illustrating an example of the URL group identified by the analysis unit according to the first embodiment.

FIG. 8 is a diagram illustrating an example of a URL list generated by a URL list generation unit according to the first embodiment.

FIG. 9 is a diagram illustrating another example of the URL list generated by the URL list generation unit according to the first embodiment.

FIG. 11 is a diagram for describing priority change processing by a priority change unit of an external evaluation function link unit according to the first embodiment.

FIG. 12 is a diagram illustrating another example of the URL list generated by the URL list generation unit according to the first embodiment.

FIG. 13 is a flowchart illustrating a processing procedure by the URL list generation unit according to the first embodiment.

FIG. 14 is a diagram illustrating an example of a URL list generated by a URL list generation unit according to a modification of the first embodiment.

DESCRIPTION OF EMBODIMENTS

Hereinafter, embodiments of a URL selection method, a URL selection system, a URL selection device, and a URL selection program that are to be disclosed will be described in detail based on the drawings. Note that the invention to be disclosed is not limited by the embodiments.

[a] First Embodiment

Figure 1:
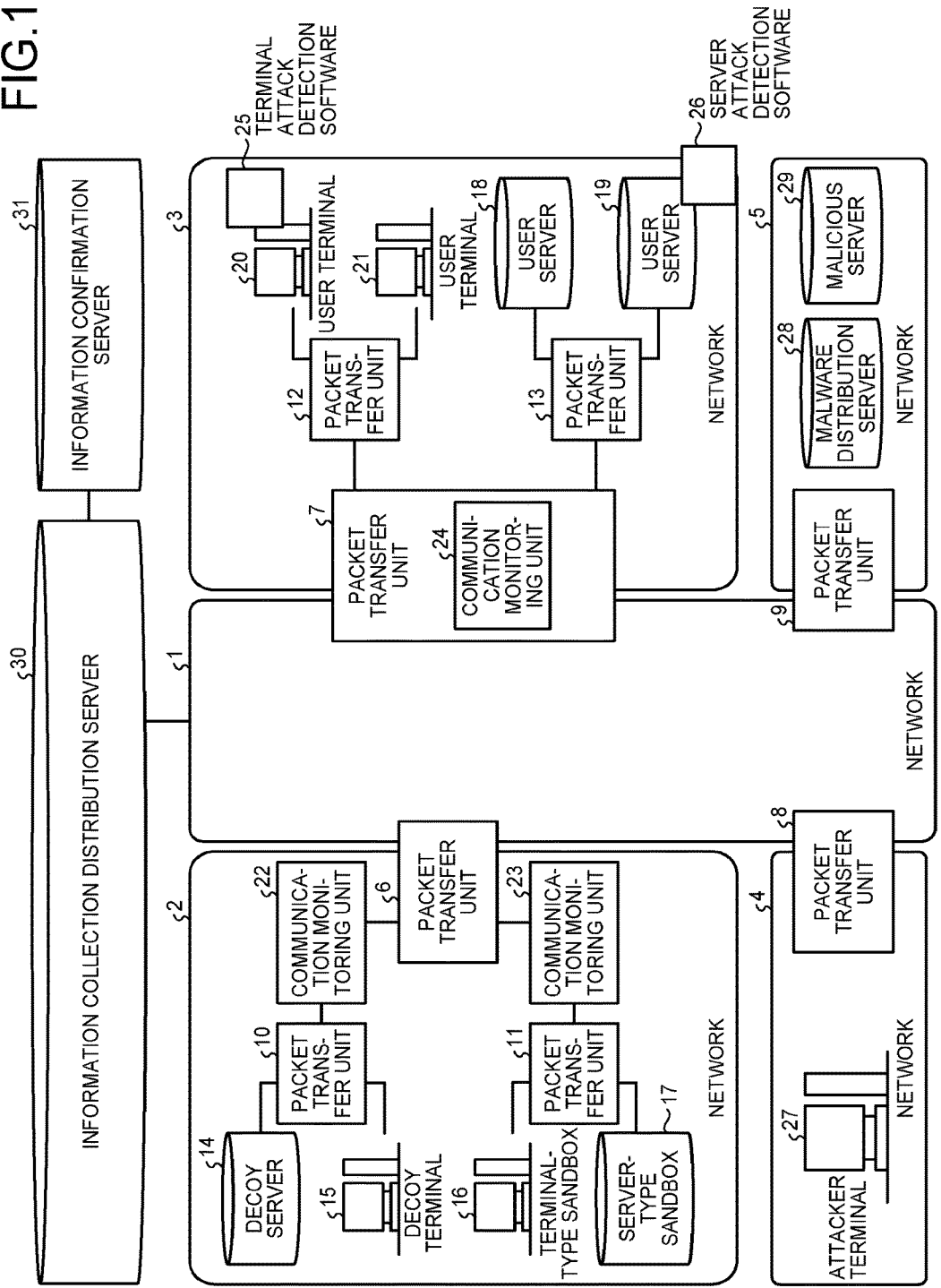
FIG. 1 is a diagram illustrating a configuration example of a network system including an information collection distribution server according to a first embodiment.

FIG. 1 is a diagram illustrating a configuration example of a network system including an information collection distribution server 30 according to the first embodiment. As illustrated in FIG. 1, the information collection distribution server 30 according to the first embodiment is connected to networks 2 to 5 through a network 1. Note that the information collection distribution server 30 may also be referred to as "URL selection device".

The network 1 may be a wide area network such as the Internet, or may be a relatively narrow area network such as an office network. This network 1 accommodates the networks 2 to 5. The networks 2 to 5 are communicatively connected to one another by packet transfer units 6 to 9, described below. Hereinafter, the networks 2 and 3 are described as "network to be protected", and the networks 4 and 5 are described as "attack-side network".

The network 2 is a network provided to analyze a malware infection attack, and includes a decoy server 14, a decoy terminal 15, a terminal-type sandbox 16, and a server-type sandbox 17, for example. As the decoy server 14 and the decoy terminal 15, an open source honey pot provided by the honey net project, or a uniquely developed honey pot can be applied. Further, as the terminal-type sandbox 16 and the server-type sandbox 17, a product represented by FireEye, open source software, or a uniquely developed sandbox can be applied.

As illustrated in FIG. 1, the network 2 includes a packet transfer unit 6, a packet transfer unit 10, a packet transfer unit 11, a communication monitoring unit 22, and a communication monitoring unit 23. The packet transfer unit 6 controls transmission/reception of a packet between the network 2 and another network, and controls transmission/reception of a packet inside the network 2. The packet transfer unit 10 connects the decoy server 14 and the decoy terminal 15 in the network 2, and connects the decoy server 14 and the decoy terminal 15 with the terminal-type sandbox 16, the server-type sandbox 17, and another network through the packet transfer unit 6. Further, the packet transfer unit 11 connects the terminal-type sandbox 16 and the server-type sandbox 17 in the network 2, and connects the terminal-type sandbox 16 and the server-type sandbox 17 with the decoy server 14, the decoy terminal 15, and another network through the packet transfer unit 6. The packet transfer units 6, 10, and 11 correspond to a function to determine a transfer destination by reference to header information such as a media access control (MAC) address, an internet protocol (IP) address, a port number, or an HTTP header, and output a packet. Examples of the function include a switch, a router, a switch function, a router function, port forwarding, and a hypertext transfer protocol (hereinafter, HTTP) transfer function.

The communication monitoring unit 22 collects a traffic log. The communication monitoring unit 23 collects a traffic log. Here, as the traffic log, log information collectable by the communication monitoring units, various types of information, such as alert information, packet capture (pcap) information obtained by capturing a packet, syslog information of a server, can be expected. The log information collected in the decoy server 14, the decoy terminal 15, the terminal-type sandbox 16, and the server-type sandbox 17 may be able to be applied as malicious traffic log regarding an attack. Note that the communication monitoring units 22 and 23 are a function to monitor information used for transfer and a packet payload, and correspond to a packet transfer unit that stores a transferred packet inside/outside a device, in addition to a security appliance, a proxy, and antivirus software.

The communication monitoring units 22 and 23 may have a function to hold specific information and detect communication matched with the information, or may have a function to interrupt the communication and transfer the communication to another additional function. Especially, the communication monitoring units 22 and 23 may have a function to store a characteristic of an attack as the specific information and detect an attack when considering communication matched with the information as the attack, or may have a function to interrupt the attack and transfer the attack to another additional function called quarantine.

The network 3 includes, for example, a user server 18, a user server 19, a user terminal 20, and a user terminal 21. All or a part of the user server 18, the user server 19, the user terminal 20, and the user terminal 21 arranged in the network 3 are objects to be confirmed of transmission/reception of a specific type of communication.

As illustrated in FIG. 1, the network 3 includes a packet transfer unit 7, a packet transfer unit 12, and a packet transfer unit 13. The packet transfer unit 7 controls transmission/reception of a packet between the network 3 and another network, and controls transmission/reception of a packet within the network 3. The packet transfer unit 12 connects the user terminal 20 and the user terminal 21 in the network 3, and connects the user terminal 20 and the user terminal 21 with the user server 18, the user server 19, and another network through the packet transfer unit 7. The packet transfer unit 13 connects the user server 18 and the user server 19 in the network 3, and connects the user server 18 and the user server 19 with the user terminal 20, the user terminal 21, and another network through the packet transfer unit 7.

The packet transfer unit 7 includes a communication monitoring unit 24. This communication monitoring unit 24 is arranged as one function in the packet transfer unit 7, unlike the communication monitoring units 22 and 23 arranged in the network 2 as devices. The communication monitoring unit 24 collects a traffic log.

Terminal attack detection software 25 is installed in the user terminal 20 and the user terminal 21. Server attack detection software 26 is installed in the user server 18 and the user server 19. The terminal attack detection software 25 and the server attack detection software 26 are, for example, antivirus software or a host-type IDS/IPS, and collect the traffic log. That is, the terminal attack detection software 25 and the server attack detection software 26 are also included in the communication monitoring unit.

Here, as the traffic log, many types of information such as log information collectable by the communication monitoring units, alert information, pcap information obtained by capturing a packet, and syslog information of a server, can be expected. A traffic log determined as an attack by the communication monitoring unit including the terminal attack detection software 25 and the server attack detection software 26 may also be able to be applied as the malicious traffic log.

When the communication monitoring unit 24 arranged in the network 3 does not detect an attack, for example, the traffic log collected in the communication monitoring unit 24 may be able to be applied as a benign traffic log. When the traffic log and the alert are collected from different types of devices and software and information on a communication partner and communication content is extracted therefrom, the description method of items may be different according to the devices and software. However, in recent years, technologies of converting the log information in different description into a unified description method and collecting the log information have been spread as security information and event management (SIEM) products.

The network 4 includes an attacker terminal 27 that attacks a specific type of communication. As illustrated in FIG. 1, the network 4 includes a packet transfer unit 8. The packet transfer unit 8 controls transmission/reception of a packet between the network 4 and another network.

The network 5 includes a malicious server 29 that transfers an accessed user terminal to another server for an attack, and a malware distribution server 28 that distributes the malware to the accessed user server and the user terminal. As illustrated in FIG. 1, the network 5 includes a packet transfer unit 9. The packet transfer unit 9 controls transmission/reception of a packet between the network 5 and another network.

The information collection distribution server 30 extracts predetermined numbers of URLs from respective URL groups identified by analyzing the traffic log by techniques in different categories, and generates a URL list. Further, the information collection distribution server 30 distributes the URL list generated as destination URLs, an access of which should be filtered. Further, the information collection distribution server 30 requests an information confirmation server 31 to evaluate the generated URL list.

The information confirmation server 31 evaluates the URL list generated by the information collection distribution server 30. For example, the information confirmation server 31 evaluates the URL list, and notifies the information collection distribution server 30 of a URL not to be selected. For example, when generating a list of malicious site URLs that cause malware infections, the information confirmation server 31 evaluates the URL list generated in the information collection distribution server 30 with a honey pot, antivirus software, or a security product that can detect a malicious site, and returns the URLs that do not cause malware infections to the information collection distribution server 30.

Figure 2:
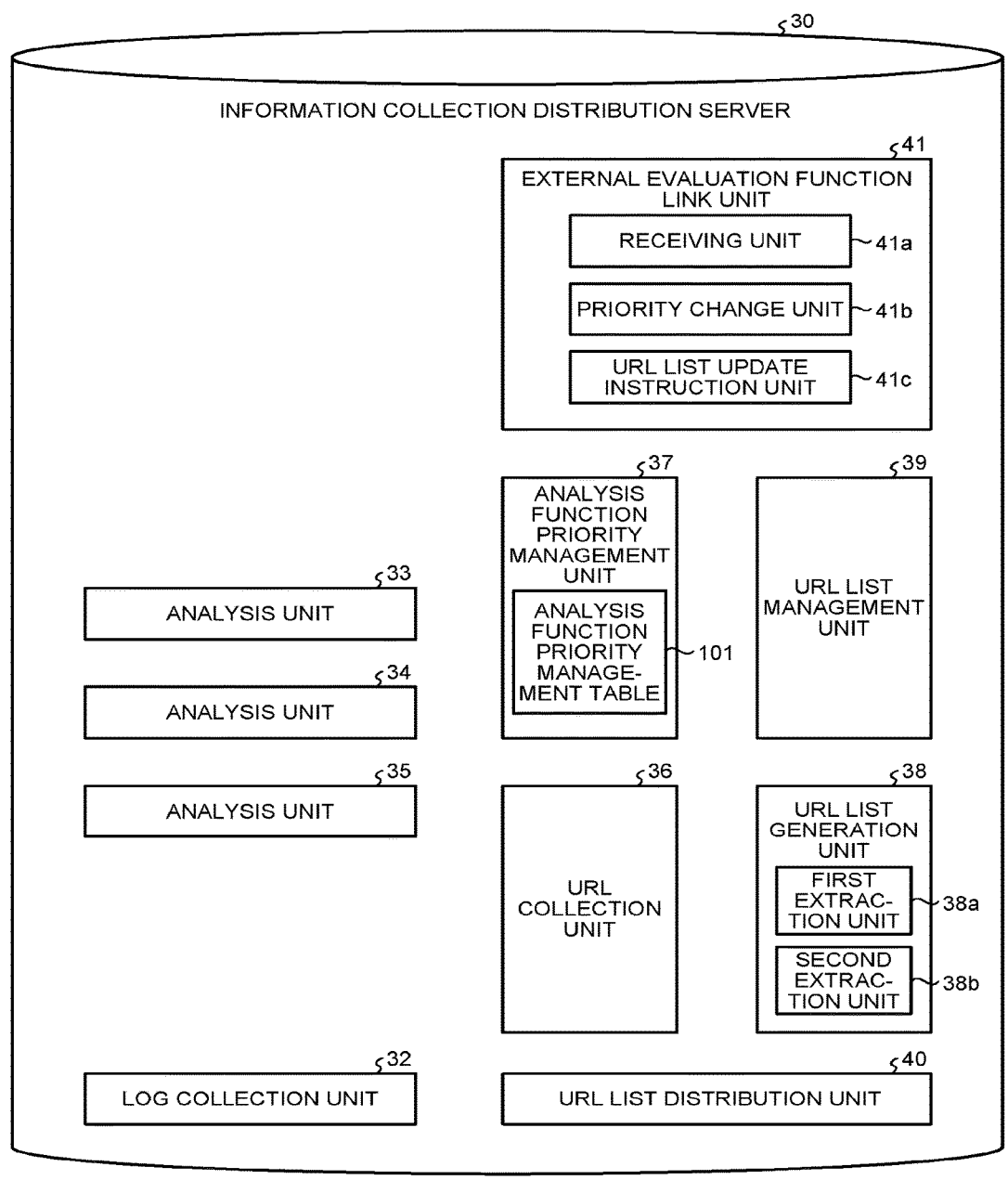
FIG. 2 is a diagram illustrating a configuration example of the information collection distribution server according to the first embodiment.

FIG. 2 is a diagram illustrating a configuration example of the information collection distribution server 30 according to the first embodiment. The information collection distribution server 30 includes a log collection unit 32, an analysis unit 33, an analysis unit 34, an analysis unit 35, a URL collection unit 36, an analysis function priority management unit 37, a URL list generation unit 38, a URL list management unit 39, a URL list distribution unit 40, and an external evaluation function link unit 41. In the present embodiment, the information collection distribution server 30 holds three analysis units. Different analysis functions may be incorporated in the analysis units, or the same analysis function may be incorporated in a plurality of or all of the analysis units. Further, the information collection distribution server 30 may hold one analysis unit, or may hold three or more analysis units.

The log collection unit 32 has a function to collect and accumulate logs from an outside. The logs may be periodically connected from the functions on the network illustrated in FIG. 1, or may be input by an operator.

The analysis function priority management unit 37 has a function to manage priority of the analysis functions, upper limit values allocated to the analysis functions, the maximum number of URLs of the URL list, and the like. For example, the analysis function priority management unit 37 includes an analysis function priority management table 101 that manages the priority of the analysis functions. Details of the analysis function priority management table 101 will be described using FIGS. 3 and 4.

FIG. 3 is a diagram illustrating an example of a data structure stored in the analysis function priority management table 101 according to the first embodiment. The analysis function priority management table 101 stores information in which the "analysis technique", "priority", and the "upper limit value" are associated with one another, and manages the priority of the analysis functions.

Here, the "analysis technique" stored in the analysis function priority management table 101 indicates the category of the analysis function. For example, data values such as an "analysis unit 33" and an "analysis unit 34" are stored in the "analysis technique". When the same analysis technique is incorporated in a plurality of analysis units, correspondence between the analysis technique and the analysis unit is held in a table or a database, and the correspondence is managed. Further, the "priority" stored in the analysis function priority management table 101 indicates order of the priority to extract the URL in processing of generating the URL list described below. For example, data values such as "1" and "2" are stored in the "priority". Here, in the example illustrated in FIG. 3, the priority is high in ascending order of the numerical value. That is, the priority "1" is highest, and the priority becomes lower in order of the priority "2" and the priority "3".

The "upper limit value" stored in the analysis function priority management table 101 indicates an upper limit value of the number of URLs to be extracted by each of the analysis functions. For example, data values such as "4" and "3" are stored in the "upper limit value". In the example illustrated in FIG. 3, an example in which the analysis function priority management table 101 manages the "upper limit value" will be described. However, the "upper limit value" may be managed by another table other than the analysis function priority management table 101.

As an example, the analysis function priority management table 101 illustrated in FIG. 3 indicates that the priority of the URL group identified by the analysis unit 34 is 1, and the upper limit value of the number of URLs to be extracted from the URL group is 4. Further, the analysis function priority management table 101 illustrated in FIG. 3 indicates that the priority of the URL group identified by the analysis unit 33 is 2, and the upper limit value of the number of URLs to be extracted from the URL group is 3. Further, the analysis function priority management table 101 illustrated in FIG. 3 indicates that the priority of the URL group identified by the analysis unit 35 is 3, and the upper limit value of the number of URLs to be extracted from the URL group is 3.

The analysis function priority management unit 37 sets the priority to the analysis units 33 to 35, and sets the upper limit values of the minimum numbers of extractable URLs such that a total of the upper limit values becomes a fixed number or less, from the URL groups identified by all of the analysis functions. For example, the analysis function priority management unit 37 sets the maximum number of URLs that can be described in the URL list to 10. The total of the upper limit values may be or may not be matched with the maximum number of URLs that can be described in the URL list. The "maximum number of URLs" may also be referred to as a "predetermined number of URLs".

Further, the analysis function priority management unit 37 can manage the maximum number of URLs that can be described in the URL list by the analysis function priority management table 101, or may manage the maximum number of URLs by another table. Further, the analysis function priority management unit 37 may indicate the upper limit value by a percentage. For example, the analysis function priority management unit 37 sets the upper limit value of the analysis unit 34 with the priority of "1" to "60%", sets the upper limit value of the analysis unit 33 with the priority of "2" to "30%", and sets the upper limit value of the analysis unit 35 with the priority of "3" to "10%". Here, when the maximum number of URLs that can be described in the URL list is 10, six URLs are extracted from the URL group identified by the analysis unit 34, three URLs are extracted from the URL group identified by the analysis unit 33, and one URL is extracted from the URL group identified by the analysis unit 35.

FIG. 4 is a diagram illustrating another example of the data structure stored in the analysis function priority management table 101 according to the first embodiment. Information of items of the analysis function priority management table 101 illustrated in FIG. 4 is similar to the information indicated by the items of the analysis function priority management table 101 illustrated in FIG. 3.

As an example, the analysis function priority management table 101 illustrated in FIG. 4 indicates that the priority of the URL group identified by the analysis unit 34 is 1, and the upper limit value of the number of URLs to be extracted from the URL group is 8. Further, the analysis function priority management table 101 illustrated in FIG. 4 indicates that the priority of the URL group identified by the analysis unit 33 is 2, and the upper limit value of the number of URLs to be extracted from the URL group is 1. Further, the analysis function priority management table 101 illustrated in FIG. 4 indicates that the priority of the URL group identified by the analysis unit 35 is 3, and the upper limit value of the number of URLs to be extracted from the URL group is 1.

Referring back to FIG. 2. The analysis units 33, 34, and 35 have a function to generate the URL group. For example, the analysis units 33, 34, and 35 identify the URL group using the logs collected and accumulated by the log collection unit 32. Further, for example, the analysis units 33, 34, and 35 identify the URL group using a known URL list.

Here, in the present embodiment, the analysis units 33 to 35 respectively identify malicious URL groups by respective different analysis techniques. For example, the analysis unit 33 identifies URLs with host portions configured from IP addresses, the analysis unit 34 identifies URLs with a low frequency of observation in the log, and the analysis unit 35 identifies URLs with high similarity to the known URL list. Note that the "malicious URL group" referred to here indicates URLs that infect the malware when accessed.

An example of the URL groups identified by the analysis units 33 to 35 will be described using FIGS. 5 to 7. FIG. 5 is a diagram illustrating an example of the URL group identified by the analysis unit 33 according to the first embodiment, FIG. 6 is a diagram illustrating an example of the URL group identified by the analysis unit 34 according to the first embodiment, and FIG. 7 is a diagram illustrating an example of the URL group identified by the analysis unit 35 according to the first embodiment.

As illustrated in FIG. 5, the "URL group identified by the analysis unit 33" is further associated with "the order of priority" allocated by each of the analysis functions. In the example of FIG. 5, the analysis unit 33 identifies a URL "http://host#1/d-A/d-B/d-C/file-a" as the order of priority "1", and a URL "http://host#2/d-D/d-E/d-C/file-b?x=12" as the order of priority "2".

Similarly, as illustrated in FIG. 7, the "URL group identified by the analysis unit 35" is further associated with "the order of priority" allocated by each of the analysis function. Meanwhile, as illustrated in FIG. 6, the "URL group identified by the analysis unit 34" is not associated with "the order of priority". As described above, the analysis units 33 to 35 may provide or may not provide the order of priority to the URLs of the identified URL groups.

Here, as illustrated in FIGS. 5 to 7, the URL groups identified by the analysis functions are configured from a method portion, a portion called domain name or FQDN name, a path portion, a file name, a variable name, and an input value. The configuration of the URL will be described using URL "http://host#2/d-D/d-E/d-C/file-b?x=12" with "the order of priority" of "2" in FIG. 5.

The method portion is represented by the description of "http" and the like. The portion called domain name or FQDN name is described as "host#2" or the like. The pass portion is described as "d-D/d-E/d-C" or the like. The file name is described as "file-b" or the like. The variable name is "x" or the like described between "?" and "=". The input value is described in and after "=". Further, the variable name and the input value make a pair, and a plurality of pairs can be described in and after "?" with "&".

Referring back to FIG. 2. The URL collection unit 36 has a function to collect the URL groups identified by the respective analysis units 33 to 35. The URL collection unit 36 may collect the URLs upon an event of generation of the URL groups by the analysis units 33 to 35, or may periodically collect the URLs from the analysis units 33 to 35.

The URL list generation unit 38 includes, for example, a first extraction unit 38a and a second extraction unit 38b, and has a function to generate the URL list using the information of the URL groups collected by the URL collection unit 36 and management information held in the analysis function priority management unit 37.

For example, the first extraction unit 38a extracts the URLs according to the minimum numbers of extractable URLs corresponding to the analysis functions from the respective URL groups. When the total number of URLs extracted from the URL groups is less than a fixed value, the second extraction unit 38b re-extracts the URLs in order from the URL group identified by the analysis unit with high priority until the total number of URLs is matched with the fixed value, or until the total number of URLs is within the fixed value and all of URLs identified by the analysis units are extracted.

Here, the URL list generation unit 38 according to the first embodiment extracts the URLs from the URL groups according to the order of description when the order of priority is not described in the information of the URL groups collected by the URL collection unit 36, or according to the order of priority when the order of priority is described. Further, the URL list generation unit 38 extracts the URLs in the order of description when the order of priority has the same order. Note that the URL list generation unit 38 may extract the URLs according to the order of priority, or may extract the URLs in the order of description or in reverse order of description when the order of priority is described, when extracting the URLs from the URL groups.

A case of extracting the URL list using the analysis function priority management table 101 illustrated in FIG. 3 will be described. First, the first extraction unit 38a attempts extraction of four URLs that are the upper limit value, from the URL group identified by the analysis unit 34 with the priority of "1". Here, the total number of the URL groups identified by the analysis unit 34 is four. Therefore, the first extraction unit 38a extracts four URLs from the URL groups identified by the analysis unit 34.

Then, the first extraction unit 38a determines that the total number of the extracted URLs is less than the predetermined number of URLs, and attempts extraction of three URLs that are the upper limit value, from the URL group identified by the analysis unit 33 with the priority of "2". In this stage, seven URLs are extracted to the URL list. Next, the first extraction unit 38a determines that the total number of the extracted URLs is less than the predetermined number of URLs, and attempts extraction of three URLs that are the upper limit value from the URL group identified by the analysis unit 35 with the priority of "3". In this stage, ten URLs are extracted to the URL list.

After termination of the URL extraction processing from the URL groups based on the priority, the first extraction unit 38a determines whether the total number of the extracted URLs is matched with the predetermined number of URLs. Note that, here, a case where the first extraction unit 38a determines that the total number of the extracted URLs is matched with the predetermined number of URLs will be described. In such a case, the first extraction unit 38a generates the URL list configured from the predetermined number of URLs (for example, ten URLs). The URL list generated by the present processing is illustrated in FIG. 8.

FIG. 8 is a diagram illustrating an example of the URL list generated by the URL list generation unit 38 according to the first embodiment. As illustrated in FIG. 8, the URL list includes the URL group identified by the analysis unit 34 with the priority of "1" including "http://host#7/d-D/d-H/d-E/file-g?y=1", "http://host#2/d-E/d-J/d-K/file-e", "http://host#5/d-X/d-O/d-P/file-art?user=l&pw=ad", and "http://host#9/d-H/d-R/file-tmp". Further, as illustrated in FIG. 8, the URL list includes the URL group identified by the analysis unit 33 with the priority of "2" including "http://host#1/d-A/d-B/d-C/file-a", "http://host#2/d-D/d-E/d-C/file-b?x=12", and "http://host#3/d-A/d-H/d-Z/file-x?d=1224". Further, as illustrated in FIG. 8, the URL list includes the URL group identified by the analysis unit 35 with the priority of "3" including "http://host#4", "http://host#3/d-R/d-X/d-D/file-i?id=12312", and "http://host#8/d-A/d-B/d-C/file-t".

Next, a case of extracting the URL list using the analysis function priority management table 101 illustrated in FIG. 4 will be described. First, the first extraction unit 38a attempts extraction of eight URLs that are the upper limit value, from the URL group identified by the analysis unit 34 with the priority of "1". However, the total number of the URL groups identified by the analysis unit 34 is four. Therefore, the first extraction unit 38a extracts four URLs from the URL groups identified by the analysis unit 34.

Then, the first extraction unit 38a determines that the total number of the extracted URLs is less than the predetermined number of URLs, and attempts extraction of one URL that is the upper limit value from the URL group identified by the analysis unit 33 with the priority of "2". In this stage, five URLs are extracted to the URL list. Next, the first extraction unit 38a determines that the total number of the extracted URLs is less than the predetermined number of URLs, and attempts extraction of one URL that is the upper limit value, from the URL group identified by the analysis unit 35 with the priority of "3". In this stage, six URLs are extracted to the URL list.

After termination of the URL extraction processing from the URL groups based on the priority, the first extraction unit 38a determines whether the total number of the extracted URLs is matched with the predetermined number of URLs. Note that, here, a case where the first extraction unit 38a determines that the total number of the extracted URLs is less than the predetermined number of URLs will be described. In such a case, the second extraction unit 38b further extracts the URLs within the predetermined number of URLs based on the priority. For example, the second extraction unit 38b repeats the processing of further extracting the URLs up to the upper limit value in order from the URL group with high priority until the total number of the extracted URLs is matched with the predetermined number of URLs, or until extracting all of the URLs included in the URL group within the predetermined number of URLs.

To be more specific, the second extraction unit 38b pays attention to the analysis unit 34 with the priority of "1" again, and attempts exaction of all of extractable URLs within the range of the maximum value of the URL list. However, the second extraction unit 38b determines that all of the URLs have already been extracted from the URL group identified by the analysis unit 34, and attempts extraction of all of extractable URLs within the range of the maximum value of the URL list from the URL group identified by the analysis unit 33 with the priority of "2". As a result, the second extraction unit 38b generates the URL list configured from the predetermined number of URLs (for example, ten URLs). The URL list generated by the present processing is illustrated in FIG. 9.

FIG. 9 is a diagram illustrating another example of the URL list generated by the URL list generation unit 38 according to the first embodiment. As illustrated in FIG. 9, the URL list includes the URL group identified by the analysis unit 34 with the priority of "1" including "http://host#7/d-D/d-H/d-E/file-g?y=1", "http://host#2/d-E/d-J/d-K/file-e", "http://host#5/d-X/d-O/d-P/file-art?user=1&pw-ad", and "http://host#9/d-H/d-R/file-tmp". Further, as illustrated in FIG. 9, the URL list includes the URL group identified by the analysis unit 33 with the priority of "2" including "http://host#1/d-A/d-B/d-C/file-a". Further, as illustrated in FIG. 9, the URL list includes the URL group identified by the analysis unit 35 with the priority of "3" including "http://host#4". Further, as illustrated in FIG. 9, the URL list includes the URL group identified by the analysis unit 33 with the priority of "2" including "http://host#2/d-D/d-E/d-C/file-b?x=12", "http://host#3/d-A/d-H/d-Z/file-x?d=1224", "http://host#4/d-S/d-S/d-D/file-c?a=user1", and "http://host#3/d-M/d-N/d-C/file-w".

Note that at least either the first extraction unit 38a or the second extraction unit 38b may confirm whether the same URL has already been extracted in the extraction, and may exclude the already extracted URL from the object to be extracted. Further, at least either the first extraction unit 38a or the second extraction unit 38b may or may not calculate the present extraction as once when having extracted the already extracted URL.

Referring back to FIG. 2. The URL list management unit 39 has a function to manage the URLs described in the URL list generated by the URL list generation unit 38 in association with the information held in the information collection distribution server 30. For example, the URL list management unit 39 has a function to manage the analysis functions that output the URLs and a function to manage dates and times described in the URL list.

Further, for example, the URL list management unit 39 provides priority in the URL list, to the URLs in the URL list in order of extraction from the URL groups identified by the analysis functions to the URL list. When extracting a URL, the URL list management unit 39 manages the analysis function that identifies the URL and the order of priority when the analysis function provides the order of priority to the URL in association with the extracted URL.

The URL list distribution unit 40 has a function to transmit the URL list generated by the URL list generation unit 38 to an outside. For example, the URL list distribution unit 40 distributes the URL list to a security-related device as destination URLs, accesses from which are to be filtered. Note that the "security-related device" referred to here includes the communication monitoring units 22 and 23 of the network 2, the communication monitoring unit 24, the terminal attack detection software 25, and the server attack detection software 26 of the network 3. As for the distribution method, the URL list distribution unit 40 may actively distribute the URL list, or may passively distribute the URL list. Note that the operator may acquire the URL list. Further, for example, the URL list distribution unit 40 requests the information confirmation server 31 to evaluate the generated URL list.

The external evaluation function link unit 41 includes a receiving unit 41a that receives an evaluation result of the URL list from an outside, a priority change unit 41b that controls the priority of the analysis functions managed by the analysis function priority management unit 37, or the priority and the upper limit value, according to the received result, and a URL list update instruction unit 41c that instructs the URL list generation unit 38 to generate the URL list with latest information.

Figure 10:
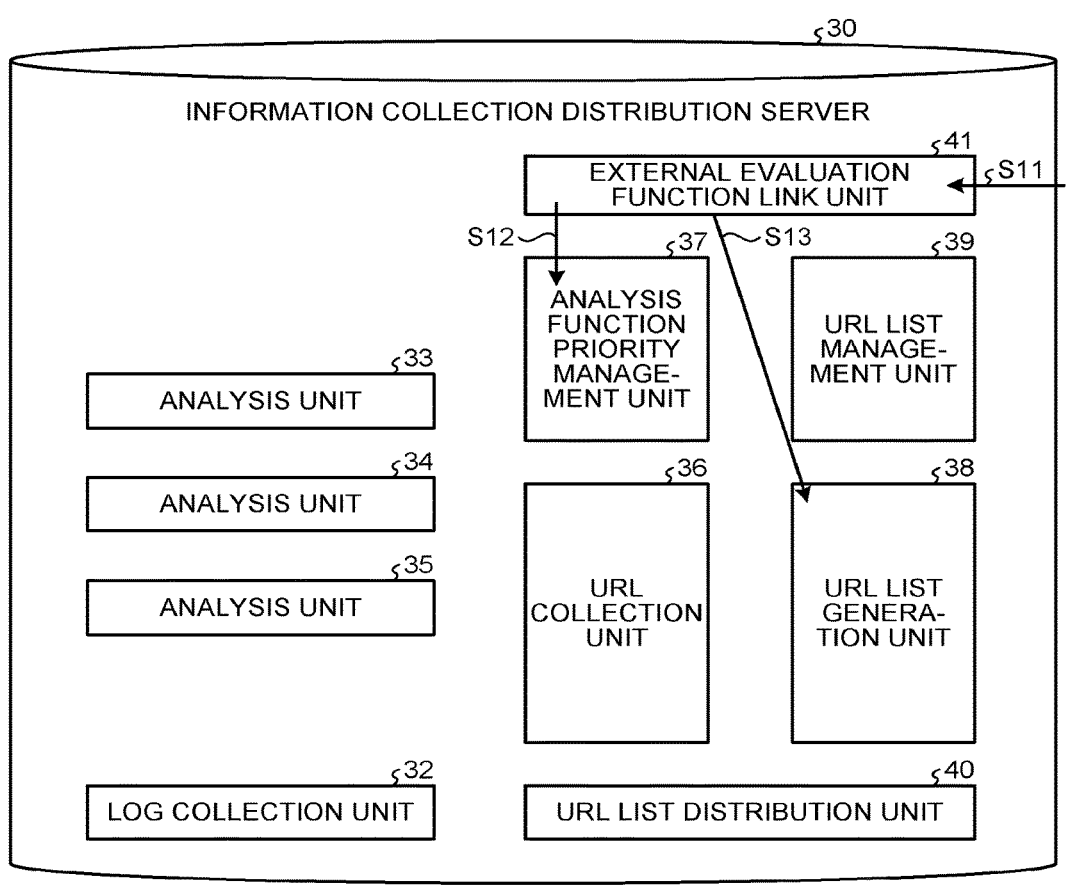
FIG. 10 is a diagram for describing a processing operation of an external evaluation function link unit according to the first embodiment.

FIG. 10 is a diagram for describing a processing operation of the external evaluation function link unit 41 according to the first embodiment. As illustrated in FIG. 10, the receiving unit 41a of the external evaluation function link unit 41 receives the evaluation result from the information confirmation server 31 as a message 201. Note that, in the example illustrated in FIG. 10, the receiving unit 41a of the external evaluation function link unit 41 assumes that an appropriate URL being not described in the URL group identified by the analysis unit 34 has been notified (step S11).

In such a case, the priority change unit 41b of the external evaluation function link unit 41 instructs the analysis function priority management unit 37 to change the priority in the analysis function priority management table 101 (step S12). For example, a case of changing the priority in the analysis function priority management table 101 illustrated in FIG. 4 to the priority in the analysis function priority management table 101 illustrated in FIG. 11. FIG. 11 is a diagram for describing priority change processing by the priority change unit 41b of the external evaluation function link unit 41 according to the first embodiment.

For example, when the malicious URL is not included only in the URL group identified by the analysis unit 34, the priority change unit 41b of the external evaluation function link unit 41 lowers the priority of the analysis unit 34 in the analysis function priority management table 101. In the example illustrated in FIG. 11, the priority change unit 41b of the external evaluation function link unit 41 instructs the analysis function priority management unit 37 to change the priority of the analysis unit 34 with the priority of "1" in FIG. 4 to "2" and change the priority of the analysis unit 33 with the priority of "2" in FIG. 4 to "1".

Further, the priority change unit 41b of the external evaluation function link unit 41 instructs the analysis function priority management unit 37 to change the upper limit value in a form corresponding to the priority when the analysis function priority management unit 37 has changed the priority in the analysis function priority management table 101. For example, the priority change unit 41b of the external evaluation function link unit 41 instructs, when changing the upper limit value of the analysis function priority management table 101, the analysis function priority management unit 37 to change the priority to "1" and the upper limit value to "8" of the analysis unit 33, and change the priority to "2" and the upper limit value to "1" of the analysis unit 34, in a case of lowering the priority of the analysis unit 34 with the priority of "1" where the upper limit value "8" has been previously allocated to the analysis unit 34 with the priority of "1" and the upper limit value "1" has been previously allocated to the analysis unit 33 with the priority of "2". Note that the priority change unit 41b of the external evaluation function link unit 41 may not instruct the analysis function priority management unit 37 to change the upper limit value in a form corresponding to the priority when having changed the priority in the analysis function priority management table 101.

Referring back to FIG. 10. Following that, the URL list update instruction unit 41c of the external evaluation function link unit 41 instructs the URL list generation unit 38 to create the URL list (step S13). In other words, the URL list update instruction unit 41c of the external evaluation function link unit 41 instructs the first extraction unit 38a and the second extraction unit 38b to execute the URL extraction processing, based on the analysis function priority management table 101 with the changed priority. The first extraction unit 38a and the second extraction unit 38b of the URL list generation unit 38 then perform extraction processing using the analysis function priority management table 101 illustrated in FIG. 11, and creates the URL list illustrated in FIG. 12, for example, as a new URL list. Note that the URL list update instruction unit 41c of the external evaluation function link unit 41 may also be referred to as "extraction instruction unit".

FIG. 12 is a diagram illustrating another example of the URL list generated by the URL list generation unit 38 according to the first embodiment. As illustrated in FIG. 12, the URL list includes the URL group identified by the analysis unit 33 with the priority of "1" including "http://host#1/d-A/d-B/d-C/file-a", "http://host#2/d-D/d-E/d-C/file-b?x=12", "http://host#3/d-A/d-H/d-Z/file-x?d-1224", "http://host#4/d-S/d-S/d-D/file-c?a=user1", and "http://host#3/d-M/d-N/d-C/file-w". Further, as illustrated in FIG. 12, the URL list includes the URL group identified by the analysis unit 34 with the priority of "2" including "http://host#7/d-D/d-H/d-E/file-g?y=1". Further, as illustrated in FIG. 12, the URL list includes the URL group identified by the analysis unit 35 with the priority of "3" including "http://host#4". Further, as illustrated in FIG. 12, the URL list includes the URL group identified by the analysis unit 34 with the priority of "2" including "http://host#2/d-E/d-J/d-K/file-e", "http://host#5/d-X/d-O/d-P/file-art?user=1&pw=ad", and "http://host#9/d-H/d-R/file-tmp". As described above, the URL list illustrated in FIG. 12 is different from the URL list illustrated in FIG. 9 in the content of the extracted URLs and the description order of the URLs.

A processing procedure by the URL list generation unit 38 according to the first embodiment will be described using FIG. 13. FIG. 13 is a flowchart illustrating a processing procedure by the URL list generation unit 38 according to the first embodiment.

As illustrated in FIG. 13, the first extraction unit 38a selects the URL group with the highest priority by reference to the analysis function priority management table 101 (step S101). Next, the first extraction unit 38a extracts the URLs up to the upper limit value within the predetermined number of URLs from the selected URL group (step S102). Then, the first extraction unit 38a determines whether the total number of the extracted URLs has reached the predetermined number of URLs (step S103).

Here, when the first extraction unit 38a has determined that the total number of the extracted URLs has reached the predetermined number of URLs (step S103, Yes), the first extraction unit 38a terminates the processing. Meanwhile, when the first extraction unit 38a has not determined that the total number of the extracted URLs has reached the predetermined number of URLs (step S103, No), the first extraction unit 38a determines whether having performed the extraction processing from all of the URL groups (step S104). When the first extraction unit 38a has not determined to have performed the extraction processing from all of the URL groups (step S104, No), the first extraction unit 38a selects the URL group with the next highest priority (step S105) and moves onto step S102. The first extraction unit 38a then repeatedly executes the processing of steps S102 to S104 of extracting the URLs up to the upper limit value within the predetermined number of URLs in order from the URL group with high priority, until performing the extraction processing from all of the URL groups, or until the total number of the extracted URLs reaches the predetermined number of URLs.

When the first extraction unit 38a has determined to have performed the extraction processing from all of the URL groups (step S104, Yes), the second extraction unit 38b selects the URL group with the highest priority (step S106). The second extraction unit 38b then extracts the extractable URL within the predetermined number of URLs (step S107).

Following that, the second extraction unit 38b determines whether the total number of the extracted URLs has reached the predetermined number of URLs (step S108). When the second extraction unit 38b has determined that the total number of the extracted URLs has reached the predetermined number of URLs (step S108, Yes), the second extraction unit 38b terminates the processing. Meanwhile, when the second extraction unit 38b has not determined that the total number of the extracted URLs has reached the predetermined number of URLs (step S108, No), the second extraction unit 38b determines whether having performed the extraction processing from all of the URL groups (step S109).

When the second extraction unit 38b has not determined to have performed the extraction processing from all of the URL groups (step S109, No), the second extraction unit 38b selects the URL group with the next highest priority (step S110), and moves onto step S107. Then, the second extraction unit 38b repeatedly executes the processing of steps S107 to S109 of extracting the extractable URLs within the predetermined number of URLs in order from the URL group with high priority, until performing the extraction processing from all of the URL groups, or until the total number of the extracted URLs reaches the predetermined number of URLs. Meanwhile, when the second extraction unit 38b has determined to have performed the extraction processing from all of the URL groups (step S109, Yes), the second extraction unit 38b terminates the processing.

As described above, when using a plurality of the analysis functions, the information collection distribution server 30 according to the first embodiment extracts the URLs and generates the URL list from the URL groups identified by the analysis functions according to the upper limit value allocated to the analysis functions and based on the maximum number of allowable URLs, while maintaining the order of priority. Accordingly, the information collection distribution server 30 according to the first embodiment can make use of the URL list generation from multi-views that can be reflected to the URL list by using a plurality of the analysis functions, and can generate the URL list that can suppress the detection omission. In other words, when generating the URL list from the malicious URL analyzed by the analysis techniques, the information collection distribution server 30 can suppress the detection omission of the malicious URLs.

Further, in the first embodiment, the information collection distribution server 30 requests evaluation of the generated URL list, and changes the priority according to the evaluation result. As a result, the information collection distribution server 30 according to the first embodiment can create the URL list that enhances security strength, when creating the URL list of the malicious sites that cause the malware infections when accessed.

[b] Modification of First Embodiment

In the first embodiment, the description has been given such that the second extraction unit 38b performs the extraction processing without considering the priority. However, an embodiment is not limited thereto. For example, the second extraction unit 38b may perform extraction processing, in consideration of priority.

To be specific, about URLs to be extracted from URL groups, a second extraction unit 38b according to a modification of the first embodiment extracts the URLs according to the order of priority, when the order of priority is provided to the URLs in each of the URL group. Meanwhile, the second extraction unit 38b according to the modification of the first embodiment extracts the URLs in predetermined order, when the order of priority is not provided to the URLs in the URL groups.

Note that a first extraction unit 38a according to the modification of the first embodiment performs similar processing to the first extraction unit 38a according to the first embodiment. That is, the first extraction unit 38a according to the modification of the first embodiment extracts the URLs up to upper limit values respectively set to the URL groups within a predetermined number of URLs, in the order of priority set to each of the URL groups, from each of the URL groups identified by analyzing an access log by techniques in different categories.

A case in which the first extraction unit 38a and the second extraction unit 38b according to the modification of the first embodiment extract the URL list using an analysis function priority management table 101 illustrated in FIG. 4 will be described. First, the first extraction unit 38a attempts extraction of eight URLs that are the upper limit value, from the URL group identified by an analysis unit 34 with the priority of "1". However, the total number of the URL groups identified by the analysis unit 34 is four. Therefore, the first extraction unit 38a extracts four URLs from the URL group identified by the analysis unit 34.

The first extraction unit 38a then determines that the total number of the extracted URLs is less than the predetermined number of URLs, and attempts extraction of one URL that is the upper limit value, from the URL group identified by the analysis unit 33 with the priority of "2". In this stage, five URLs are extracted to the URL list. Next, the first extraction unit 38a determines that the total number of the extracted URLs is less than the predetermined number of URLs, and attempts extraction of one URL that is the upper limit value, from the URL group identified by the analysis unit 35 with the priority of "3". In this stage, six URLs are extracted to the URL list.

After termination of the URL extraction processing from the URL groups based on the priority, the first extraction unit 38a determines whether the total number of the extracted URLs is matched with the predetermined number of URLs. Note that, here, a case where the first extraction unit 38a determines that the total number of the extracted URLs is less than the predetermined number of URLs will be described. In such a case, the second extraction unit 38b further extracts the URLs within the predetermined number of URLs, based on the priority. For example, the second extraction unit 38b extracts the URLs according to the order of priority, when the order of priority is provided to the URLs in the URL group, about the URLs to be extracted from each of the URL groups. Meanwhile, the second extraction unit 38b according to the modification of the first embodiment extracts the URLs in the predetermined order, when the order of priority is not provided to the URLs in the URL group.

To be more specific, the second extraction unit 38b pays attention to the analysis unit 34 with the priority of "1" again, and attempts extraction of eight URLs that are the upper limit value. However, the second extraction unit 38b determines that all of the URLs have already been extracted from the URL group identified by the analysis unit 34, and attempts extraction of one URL that is the upper limit value, from the URL group identified by the analysis unit 33 with the priority of "2". In this stage, seven URLs are described in the URL list.

Next, the second extraction unit 38b attempts extraction of one URL that is the upper limit value, from the URL group identified by the analysis unit 35 with the priority of "3". In this stage, eight URLs are described in the URL list. Next, the second extraction unit 38b pays attention to the analysis unit 34 with the priority of "1" again, and attempts extraction of eight URLs that are the upper limit value. However, the second extraction unit 38b determines that all of the URLs have already been extracted from the URL group identified by the analysis unit 34, and attempts extraction of one URL that is the upper limit value, from the URL group identified by the analysis unit 33 with the priority of "2". In this stage, nine URLs are described in the URL list. Next, the second extraction unit 38b attempts extraction of one URL that is the upper limit value, from the analysis unit 35 with the priority of "3". As a result, the URL list configured from ten URLs can be created. The URL list generated by the present processing is illustrated in FIG. 14.

FIG. 14 is a diagram illustrating an example of the URL list generated by a URL list generation unit 38 according to the modification of the first embodiment. As illustrated in FIG. 14, the URL list includes the URL group identified by the analysis unit 34 with the priority of "1" including "http://host#7/d-D/d-H/d-E/file-g?y=1", "http://host#2/d-E/d-J/d-K/file-e", "http://host#5/d-X/d-O/d-P/file-art?user=l&pw=ad", and "http://host#9/d-H/d-R/file-tmp". Further, as illustrated in FIG. 14, the URL list includes the URL group identified by the analysis unit 33 with the priority of "2" including "http://host#1/d-A/d-B/d-C/file-a". Further, as illustrated in FIG. 14, the URL list includes the URL group identified by the analysis unit 35 with the priority of "3" including "http://host#4". Further, as illustrated in FIG. 14, the URL list alternately includes the URL group identified by the analysis unit 33 with the priority of "2" and the URL group identified by the analysis unit 35 with the priority of "3". That is, "http://host#2/d-D/d-E/d-C/file-b?x=12", "http://host#3/d-R/d-X/d-D/file-i?id=12312", "http://host#3/d-A/d-H/d-Z/file-x?d=1224", and "http://host#8/d-A/d-B/d-C/file-t" are included. In this way, the URL list illustrated in FIG. 14 is different from the URL list illustrated in FIG. 9 in the content of the extracted URLs and the description order of the URLs.

Figure 15:
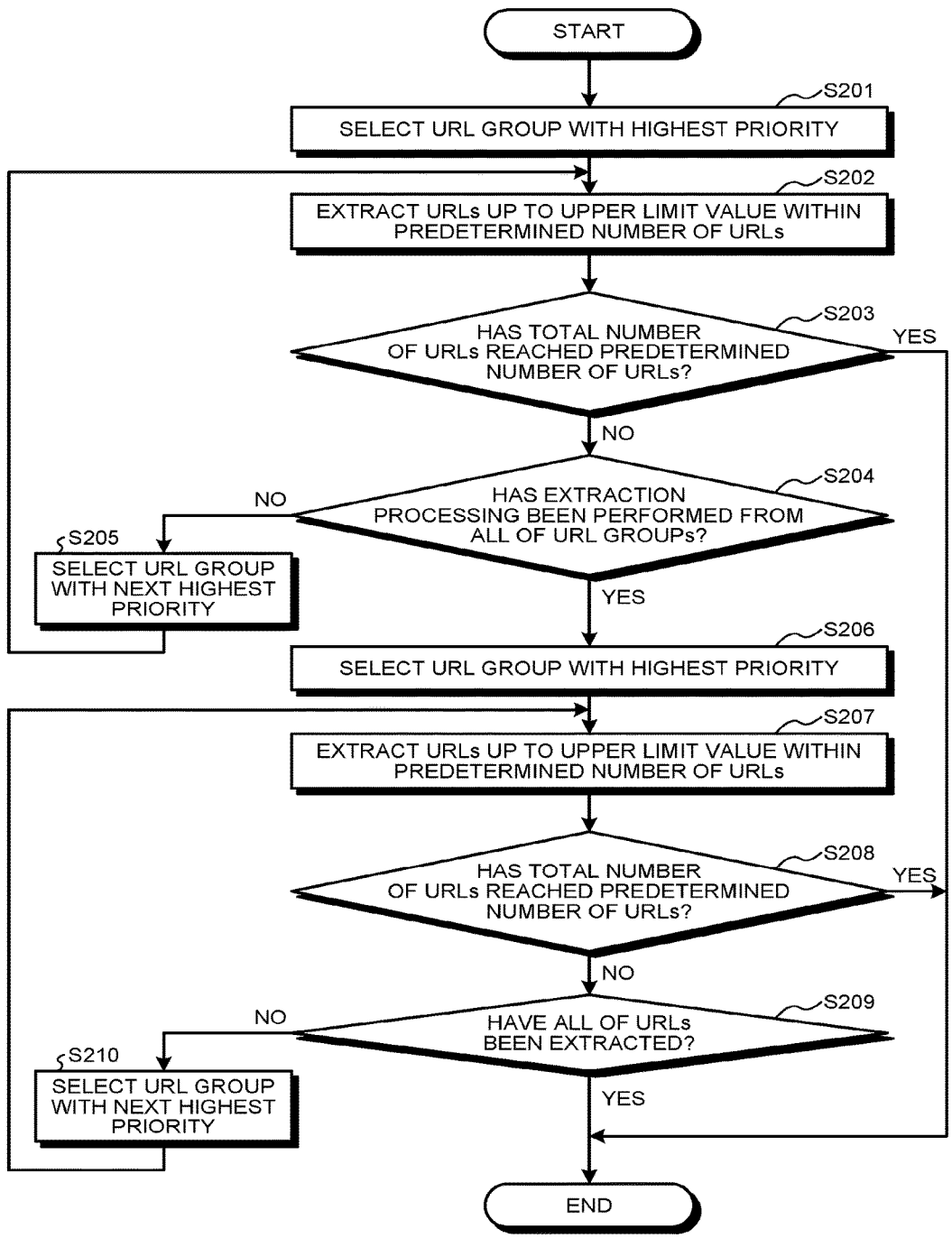
FIG. 15 is a flowchart illustrating a processing procedure by the URL list generation unit according to the modification of the first embodiment.

FIG. 15 describes a processing procedure by the URL list generation unit 38 according to the modification of the first embodiment. FIG. 15 is a flowchart illustrating a processing procedure by the URL list generation unit 38 according to the modification of the first embodiment.

As illustrated in FIG. 15, the first extraction unit 38a selects the URL group with the highest priority by reference to the analysis function priority management table 101 (step S201). Next, the first extraction unit 38a extracts the URLs up to the upper limit value within the predetermined number of URLs, about the selected URL group (step S202). The first extraction unit 38a then determines whether the total number of the extracted URLs has reached the predetermined number of URLs (step S203).

Here, when the first extraction unit 38a has determined that the total number of the extracted URLs has reached the predetermined number of URLs (step S203, Yes), the first extraction unit 38a terminates the processing. Meanwhile, when the first extraction unit 38a has not determined that the total number of the extracted URLs has reached the predetermined number of URLs (step S203, No), the first extraction unit 38a determines whether having performed the extraction processing from all of the URL groups (step S204). When the first extraction unit 38a has not determined to have performed the extraction processing from all of the URL groups (step S204, No), the first extraction unit 38a selects the URL group with the next highest priority (step S205), and moves onto step S202. Then, the first extraction unit 38a repeatedly executes the processing of steps S202 to S204 of extracting the URLs up to the upper limit value within the predetermined number of URLs in order from the URL group having high priority, until performing the extraction processing from all of the URL groups, or until the total number of the extracted URLs reaches the predetermined number of URLs.

When the first extraction unit 38a has determined to have performed the extraction processing from all of the URL groups (step S204, Yes), the second extraction unit 38b selects the URL group with the highest priority (step S206). The second extraction unit 38b then extracts the URLs up to the upper limit value within the predetermined number of URLs (step S207).

Following that, the second extraction unit 38b determines whether the total number of the extracted URLs has reached the predetermined number of URLs (step S208). When the second extraction unit 38b has determined that the total number of the extracted URLs has reached the predetermined number of URLs (step S208, Yes), the second extraction unit 38b terminates the processing. Meanwhile, when the second extraction unit 38b has not determined that the total number of the extracted URLs has reached the predetermined number of URLs (step S208, No), the second extraction unit 38b determines whether having extracted all of the URLs (step S209).

When the second extraction unit 38b has not determined to have extracted all of the URLs (step S209, No), the second extraction unit 38b selects the URL group with the next highest priority (step S210), and moves onto step S207. Note that when the second extraction unit 38b has selected the URL group with the lowest priority, the second extraction unit 38b selects the URL group with the highest priority as the URL group with the next highest priority. The second extraction unit 38b then repeatedly executes the processing of steps S207 to S209 of extracting the URLs up to the upper limit value within the predetermined number of URLs in order form the URL group with high priority, until extracting all of the URLs, or until the total number of the extracted URLs reaches the predetermined number of URLs. Meanwhile, when the second extraction unit 38b has determined to have extracted all of the URLs (step S209, Yes), the second extraction unit 38b terminates the processing.

Note that the first extraction unit 38a and the second extraction unit 38b may or may not re-extract the URLs already extracted in the URL list. When not re-extracting the already extracted URLs, the first extraction unit 38a and the second extraction unit 38b confirm whether the URLs have been extracted to the URL list at the time of extraction. Note that the first extraction unit 38a and the second extraction unit 38b may or may not calculate the present extraction as once when extracting the already extracted URL. In the processing illustrated in FIG. 15, the extraction from the analysis unit 34 from which all of the URLs have already extracted may be attempted every time, or the extraction from the analysis unit 34 may be omitted according to an attempted result of the previous time.

In the above-described embodiment, the description has been given such that the information collection distribution server 30 extracts the predetermined number of URLs from each of the URL groups identified by analyzing the traffic log by the techniques in different categories and generates the URL list, and requests the information confirmation server 31 to evaluate the generated URL list. However, an embodiment is not limited thereto. For example, the information collection distribution server 30 may not execute the processing of requesting the information confirmation server 31 to evaluate the generated URL list. In such a case, the information collection distribution server 30 may be configured without including the external evaluation function link unit 41. Further, the information collection distribution server 30 may not execute the processing of steps S11 to S13 illustrated in FIG. 10. That is, the information collection distribution server 30 does not perform the processing of changing the priority set to each of the URL groups.

Further, the information collection distribution server 30 may not execute the processing of instructing the first extraction unit 38a and the second extraction unit 38b to execute the URL extraction processing based on the changed priority. Further, the information collection distribution server 30 may be configured without including the URL list distribution unit 40 when only generation of the URL list is necessary.

Further, the information collection distribution server 30 and the information confirmation server 31 may be integrally configured.

[c] Second Embodiment

An embodiment of the present invention has been described so far. The present invention may be implemented in another embodiment other than the above-described embodiment. Here, hereinafter, another embodiment will be described.

System Configuration

All or a part of the processing described as the processing automatically performed, of the processing described in the above-described embodiment, can be manually performed. Further, all or a part of the processing described as the processing manually performed, can be automatically performed by a known method. Further, the processing procedure, control procedure, specific names, and information including various data and parameters (FIGS. 1 to 15, for example) described in the document and illustrated in the drawings can be arbitrarily changed unless specifically stated.

The configuration elements of the illustrated devices are functional and conceptual configurations, and are not necessarily configured as physically illustrated. That is, the specific forms of distribution/integration of the devices are not limited to those illustrated, and all or a part of the devices can be functionally or physically distributed/integrated according to various loads, the use state, and the like.

Program

Further, a URL selection program in which the processing executed by the information collection distribution server 30 according to the first embodiment is described in a language executable by a computer can be generated. In this case, a similar effect to the above-described embodiment can be obtained by executing the URL selection program by the computer. Further, processing similar to the above-described embodiment may be realized by recording the URL selection program to a computer readable recording medium, and causing the URL selection program recorded in the recording medium to be read and executed by the computer. Hereinafter, an example of the computer that executes the URL selection program that realizes functions similar to the information collection distribution server 30 illustrated in FIG. 2 will be described.

Figure 16:
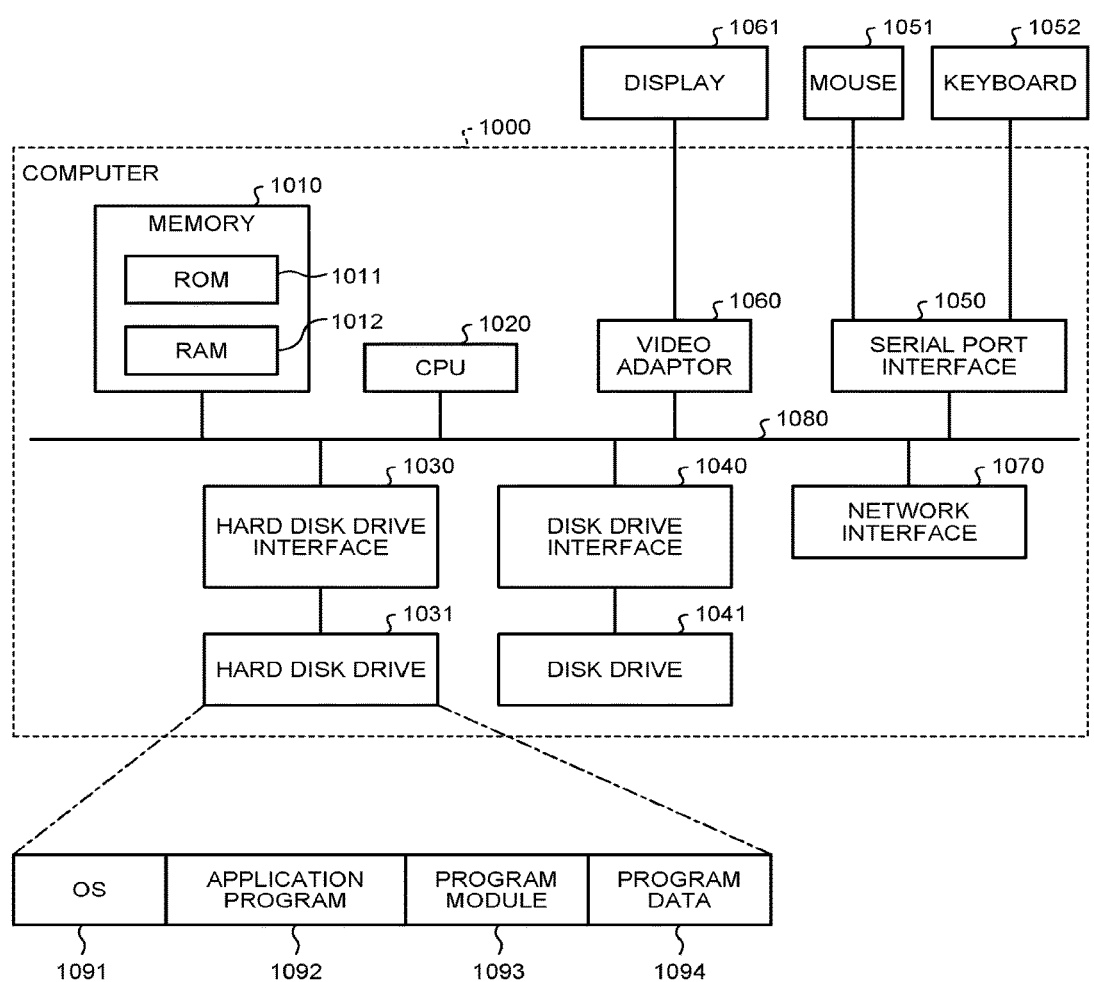
FIG. 16 is a diagram illustrating a computer that executes a URL selection program.

FIG. 16 is a diagram illustrating a computer 1000 that executes the URL selection program. As illustrated in FIG. 16, the computer 1000 includes, for example, a memory 1010, a CPU 1020, a hard disk drive interface 1030, a disk drive interface 1040, a serial port interface 1050, a video adaptor 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. A detachable storage medium such as a magnetic disk or an optical disk is inserted into the disk drive 1041. A mouse 1051 and a keyboard 1052 are connected to the serial port interface 1050, for example. A display 1061 is connected to the video adaptor 1060, for example.

Here, as illustrated in FIG. 16, the hard disk drive 1031 stores, for example, an OS 1091, an application program 1092, a program module 1093, and program data 1094. The URL selection program described in the above embodiment is stored in the hard disk drive 1031 or the memory 1010, for example.

Further, the URL selection program is stored in the hard disk drive 1031, for example, as a program module in which commands to be executed by the computer 1000 are written. To be specific, a program module 1093 in which a first extraction procedure of executing information processing similar to the first extraction unit 38*a* and a second extraction procedure of executing information processing similar to the second extraction unit 38*b* described in the above embodiment are written is stored in the hard disk drive 1031. Alternatively, the program module 1093 in which the first extraction procedure of executing information processing similar to the first extraction unit 38*a*, the second extraction procedure of executing information processing similar to the second extraction unit 38*b*, a priority change procedure of executing information processing similar to the priority change unit 41*b*, and a URL list update instruction procedure of executing information processing similar to the URL list update instruction unit 41*c*, described in the above embodiment, are written is stored in the hard disk drive 1031.

Further, data to be used in information processing by the URL selection program is stored in the hard disk drive 1031 as program data 1094, for example. Then, the CPU 1020 reads the program module 1093 and the program data 1094 stored in the hard disk drive 1031 to the RAM 1012, as needed, and execute the above-described procedures.

Note that the program module 1093 and the program data 1094 according to the URL selection program are not limited to the case of being stored to the hard disk drive 1031, and for example, may be stored in a detachable storage medium and read by the CPU 1020 through the disk drive 1041 or the like. Alternatively, the program module 1093 and the program data 1094 according to the URL selection program may be stored in another computer connected through a network such as a LAN or a wide area network (WAN) and read by the CPU 1020 through the network interface 1070.

Others

Note that the URL selection program described in the present embodiment can be distributed through a network such as the Internet. Further, the specific program can be recorded in a recording medium readable by a computer, such as a hard disk, a flexible disk (FD), a CD-ROM, a MO, or a DVD and can be executed by being read from the recording medium by the computer.

REFERENCE SIGNS LIST 1 to 5 NETWORK
6 to 13 PACKET TRANSFER UNIT
14 DECOY SERVER
15 DECOY TERMINAL
16 TERMINAL-TYPE SANDBOX
17 SERVER-TYPE SANDBOX
18 to 19 USER SERVER
20 to 21 USER TERMINAL
22 to 24 COMMUNICATION MONITORING UNIT
25 TERMINAL ATTACK DETECTION SOFTWARE
26 SERVER ATTACK DETECTION SOFTWARE
27 ATTACKER TERMINAL
28 MALWARE DISTRIBUTION SERVER
29 MALICIOUS SERVER
30 INFORMATION COLLECTION DISTRIBUTION SERVER
31 INFORMATION CONFIRMATION SERVER
32 LOG COLLECTION UNIT
33 to 35 ANALYSIS UNIT
36 URL COLLECTION UNIT
37 ANALYSIS FUNCTION PRIORITY MANAGEMENT UNIT
38 URL LIST GENERATION UNIT
38*a* FIRST EXTRACTION UNIT
38*b* SECOND EXTRACTION UNIT
39 URL LIST MANAGEMENT UNIT
40 URL LIST DISTRIBUTION UNIT
41 EXTERNAL EVALUATION FUNCTION LINK UNIT
41*a* RECEIVING UNIT
41*b* PRIORITY CHANGE UNIT
41*c* URL LIST UPDATE INSTRUCTION UNIT
101 ANALYSIS FUNCTION PRIORITY MANAGEMENT TABLE
1000 COMPUTER
1010 MEMORY
1011 ROM
1012 RAM
1020 CPU
1030 HARD DISK DRIVE INTERFACE
1031 HARD DISK DRIVE
1040 DISK DRIVE INTERFACE
1041 DISK DRIVE

1050 SERIAL PORT INTERFACE
1051 MOUSE
1052 KEYBOARD
1060 VIDEO ADAPTOR
1061 DISPLAY
1070 NETWORK INTERFACE
1080 BUS
1091 OS
1092 APPLICATION PROGRAM
1093 PROGRAM MODULE
1094 PROGRAM DATA

What is claimed is:

1. A URL selection method to be executed in a URL selection device that is connected to a wide area network, the method comprising:
a first extraction step of extracting URLs up to an upper limit value of the number of URLs set to each of URL groups in a range where a total number of URLs is within a predetermined number of URLs, in order of priority set to each of the URL groups, from each of the URL groups which are differently identified by analyzing a same traffic log by a respective different analysis technique from different categories of analysis techniques, the traffic log being obtained from a terminal device configured to collect the traffic log in a first network that connects to the wide area network, wherein the wide area network is accessible by at least one of an attacker terminal, a malware distribution server, and a malicious server;
a second extraction step of further extracting URLs within the predetermined number of URLs, based on the priority, when the total number of URLs extracted from each of the URL groups in the first extraction step is less than the predetermined number of URLs;
generating a URL list based on the extracted URLs; and
distributing the URL list to a security-related device as destination URLs, accesses from which are to be filtered,
wherein the order of priority for extracting the URLs and the upper limit value is set to each of the URL groups according to the respective different analysis technique of the respective URL group, and the order of priority and the upper limit value is assigned based at least partially on whether or not a malicious URL was detected during a previous evaluation performed on a URL group identified by each of the different analysis techniques.

2. The URL selection method according to claim 1, wherein about the URLs to be extracted from each of the URL groups, when order of priority is provided to the URLs in the URL group, the first extraction step extracts the URLs according to the order of priority, and when the order of priority is not provided to the URLs in the URL group, the first extraction step extracts the URLs in predetermined order.

3. The URL selection method according to claim 1, wherein the second extraction step repeats processing of further extracting URLs up to the upper limit value in order form the URL group with high priority, until the total number of the extracted URLs is matched with the predetermined number of URLs, or until extracting all of the URLs included in the URL group within the predetermined number of URLs.

4. The URL selection method according to claim 1, wherein the second extraction step repeats processing of further extracting URLs without considering the upper limit value in order from the URL group with high priority, until the total number of the extracted URLs is matched with the predetermined number of URLs, or until extracting all of the URLs included in the URL group within the predetermined number of URLs.

5. The URL selection method according to claim 1, wherein
the second extraction step repeats processing of further extracting URLs up to the upper limit value in order form the URL group with high priority, until the total number of the extracted URLs is matched with the predetermined number of URLs, or until extracting all of the URLs included in the URL group within the predetermined number of URLs, and
the second extraction step further includes
a priority change step of changing the priority set to each of the URL groups, and
an extraction instruction step of instructing the first extraction step and the second extraction step to execute URL extraction processing, based on the priority changed in the priority change step.

6. The URL selection method according to claim 1, wherein
the second extraction step repeats processing of further extracting URLs without considering the upper limit value in order from the URL group with high priority, until the total number of the extracted URLs is matched with the predetermined number of URLs, or until extracting all of the URLs included in the URL group within the predetermined number of URLs, and
the second extraction step further includes
a priority change step of changing the priority set to each of the URL groups, and
an extraction instruction step of instructing the first extraction step and the second extraction step to execute URL extraction processing, based on the priority changed in the priority change step.

7. A URL selection system comprising:
a terminal device including a communication monitoring unit configured to collect a traffic log in a first network that connects to a wide area network, wherein the wide area network is accessible by at least one of an attacker terminal, a malware distribution server, and a malicious server; and
a URL selection device that is connected to the wide area network, including:
processing circuitry configured to implement
a first extraction unit configured to extract URLs up to an upper limit value of the number of URLs set to each of URL groups in a range where a total number of URLs is within a predetermined number of URLs, in order of priority set to each of the URL groups, from each of the URL groups which are differently identified by analyzing the same traffic log collected by the communication monitoring unit by a respective different analysis technique from different categories of analysis techniques;
a second extraction unit configured to further extract URLs within the predetermined number of URLs, based on the priority, when the total number of URLs extracted from each of the URL groups in the first extraction unit is less than the predetermined number of URLs;
wherein the processing circuitry of the URL selection device is further configured to
generate a URL list based on the extracted URLs; and distribute the URL list to a security-related device as destination URLs, accesses from which are to be filtered, wherein the order of priority for extracting the URLs and the upper limit value is set to each of the URL groups according to the respective different analysis technique of the respective URL group, and the order of priority and the upper limit value is assigned based at least partially on whether or not a malicious URL was detected during a previous evaluation performed on a URL group identified by each of the different analysis techniques.

8. A URL selection device configured to connect to a wide area network, comprising:

processing circuitry configured to implement
a first extraction unit configured to extract URLs up to an upper limit value of the number of URLs set to each of URL groups in a range where a total number of URLs is within a predetermined number of URLs, in order of priority set to each of the URL groups, from each of the URL groups which are differently identified by analyzing a same traffic log by a respective different analysis technique from different categories of analysis techniques, the traffic log being obtained from a terminal device configured to collect the traffic log in a first network that connects to the wide area network, wherein the wide area network is accessible by at least one of an attacker terminal, a malware distribution server, and a malicious server; and a second extraction unit configured to further extract URLs within the predetermined number of URLs, based on the priority, when the total number of URLs extracted from each of the URL groups in the first extraction unit is less than the predetermined number of URLs;

wherein the processing circuitry is further configured to generate a URL list based on the extracted URLs; and distribute the URL list to a security-related device as destination URLs, accesses from which are to be filtered, wherein the order of priority for extracting the URLs and the upper limit value is set to each of the URL groups according to the respective different analysis technique of the respective URL group, and the order of priority and the upper limit value is assigned based at least partially on whether or not a malicious URL was detected during a previous evaluation performed on a URL group identified by each of the different analysis techniques.

9. A non-transitory computer-readable recording medium having stored therein a URL selection program that causes a user selection device, that is connected to a wide area network, to execute a process comprising:

a first extraction procedure of extracting URLs up to an upper limit value of the number of URLs set to each of URL groups in a range where a total number of URLs is within a predetermined number of URLs, in order of priority set to each of the URL groups, from each of the URL groups which are differently identified by analyzing a same traffic log by a respective different analysis technique from different categories of analysis techniques, the traffic log being obtained from a terminal device configured to collect the traffic log in a first network that connects to the wide area network, wherein the wide area network is accessible by at least one of an attacker terminal, a malware distribution server, and a malicious server;

a second extraction procedure of further extracting URLs within the predetermined number of URLs, based on the priority, when the total number of URLs extracted from each of the URL groups in the first extraction procedure is less than the predetermined number of URLs;

generating a URL list based on the extracted URLs; and distributing the URL list to a security-related device as destination URLs, accesses from which are to be filtered, wherein the order of priority for extracting the URLs and the upper limit value is set to each of the URL groups according to the respective different analysis technique of the respective URL group, and the order of priority and the upper limit value is assigned based at least partially on whether or not a malicious URL was detected during a previous evaluation performed on a URL group identified by each of the different analysis techniques.

* * * * *